United States Patent [19]
Aritake et al.

[11] Patent Number: 5,245,170
[45] Date of Patent: Sep. 14, 1993

[54] OPTICAL SCANNER USING PLANAR REFLECTION HOLOGRAMS

[75] Inventors: Hirokazu Aritake, Isehara; Toshiyuki Ichikawa, Atsugi; Kozo Yamazaki, Zama; Fumio Yamagishi, Ebina; Hiroyuki Ikeda, Yokohama, all of Japan

[73] Assignee: Fujitsu Limited, Kawasaki, Japan

[21] Appl. No.: 978,509

[22] Filed: Nov. 18, 1992

Related U.S. Application Data

[60] Division of Ser. No. 892,405, May 29, 1992, which is a continuation of Ser. No. 451,367, Dec. 15, 1989, abandoned.

[30] Foreign Application Priority Data

| Dec. 20, 1988 | [JP] | Japan | 63-325033 |
| Dec. 20, 1988 | [JP] | Japan | 63-325034 |
| Dec. 20, 1988 | [JP] | Japan | 63-325035 |
| Jan. 13, 1989 | [JP] | Japan | 1-006702 |
| Jan. 19, 1989 | [JP] | Japan | 1-012609 |

[51] Int. Cl.$^5$ .................................. G06K 7/10
[52] U.S. Cl. ..................... 235/462; 235/467; 235/457; 359/17
[58] Field of Search ............ 235/462, 467, 472, 457; 359/15, 17

[56] References Cited

U.S. PATENT DOCUMENTS

| 4,073,566 | 2/1978 | Noguchi | 359/17 |
| 4,094,576 | 6/1978 | Heiling | 359/18 |
| 4,385,831 | 5/1983 | Ruell | 359/17 |
| 4,652,732 | 3/1987 | Nickl | 235/462 |
| 4,955,694 | 9/1990 | Käser | 359/15 |

*Primary Examiner*—John Shepperd
*Assistant Examiner*—Esther Chin
*Attorney, Agent, or Firm*—Staas & Halsey

[57] ABSTRACT

An optical scanner suitable for use with a bar code reader includes a light source for generating a laser beam, a laser beam scanning device, a scanning pattern generating optical system, and a signal light condensing optical system for deflecting scattered signal light scattered by an object to be read to introduce the light to a photo-detector. The scanning pattern generating optical system or signal light condensing optical system includes strips of planar reflective holograms disposed substantially in parallel with each other in one plane to produce a reflection beam having an angle of reflection which is different from an angle of incidence of the laser beam thereon. Another embodiment discloses a condenser integrated with one of plane mirrors for deflecting the scan beam to form a hologram module of the reflection type. The scanner is a miniaturized apparatus as a result of the reflection holograms.

5 Claims, 13 Drawing Sheets

OPTICAL SCANNER USING PLANAR REFLECTION HOLOGRAMS

This application is a division of application Ser. No. 07/892,405, filed May 29, 1992, which is a continuation of application Ser. No. 07/451,367, filed Dec. 15, 1989, now abandoned.

BACKGROUND OF THE INVENTION

This invention relates to an optical scanner for reading a bar code or the like making use of a hologram and a laser beam, and more particularly to an optical scanner for a POS (point-of-sales) terminal.

One of various types of optical scanners which scan a laser beam in accordance with a desired pattern is a hologram scanner which employs a hologram disk as a scanning means. Such employment of a hologram disk as a scanning means enables formation of a complicated scanning pattern with a simplified optical system and realization of bar code readers having a deep reading depth.

A POS bar code reader (POS scanner), which is one of various types of optical scanners, moves across a bar code applied to a commodity above a reading window to read the bar code information with a laser beam and is constituted from a laser beam generating light source, a laser beam shaping optical system, a scanning optical system, a signal light detecting optical system, a waveform shaping circuit and a bar code symbol demodulating circuit. A laser beam emitted from a He—Ne laser is shaped into a beam of a suitable diameter by the beam shaping optical system and then scanned to form a universally readable scanning pattern by the scanning optical system, and a bar code is irradiated with the scanning pattern. Scattered light reflected from the bar code is condensed by the signal light detecting optical system, in which signal light is converted into an electric signal by a photo-detector. The electric signal is shaped by the signal waveform shaping circuit and then converted by the bar code symbol demodulating circuit into numerical values, which are then sent to a POS terminal.

A prior art optical scanner is disclosed in U.S. Pat. No. 4,848,862 wherein a rotary polygon mirror is employed as a laser beam scanning means and strip holograms of the transmission type are employed for a reading window. An outline of the prior art optical scanner will be first described with reference to FIGS. 1, 2A and 2B. Referring first to FIG. 1, a reading window generally denoted at 10 is composed of three transparent substrates 11, 12 and 13 having strip holograms 11a, 12a and 13a, respectively, of the transmission type formed in different directions from each other and adhered in layers to each other such that the strip holograms 11a, 12a and 13a of the transmission type thereof may extend in an intersecting relationship to each other. As shown at a lower portion of FIG. 1, located below the reading window 10 are a scanning pattern generating mirror means 14 consisting of three side mirrors 15, 16 and 17, a concave mirror 18 having a through-hole 18a formed therein and having a curved reflecting face on an inner surface thereof, a bottom mirror 19 disposed in parallel to the reading window 10, a photo-detector 20, a mirror 21, and a polygon mirror 23 having five reflecting faces and connected to be driven to rotate by a motor 22. Such optical parts as listed above are mounted in a predetermined positional relationship together with a He—Ne laser tube 24, a beam shaper 25 and a reflecting mirror 26 on a base not shown to generally constitute the optical scanner.

Operation of the optical scanner will be described subsequently with reference to FIGS. 2A and 2B. A laser beam emitted from the laser tube 24 is first shaped in beam diameter thereof by the beam shaper 25 and then reflected toward the concave mirror 18 by the reflecting mirror 26. As shown in FIG. 2A, the laser beam 28a reflected by the reflecting mirror 26 passes through the through-hole 18a of the concave mirror 18 and is then reflected by a back mirror 27, whereafter it passes through the through-hole 18a again and is introduced to the polygon mirror 23. The laser beam 28b is then scanned within a predetermined range in accordance with an inclination of reflecting faces and rotation of the polygon mirror 23 so that it makes scanning laser beams 28c and 28d which successively scan the three side mirrors 15, 16 and 17. The scanning laser beams 28c and 28d are projected toward the reading window 10 by way of the side mirror 15, 16 or 17 and the bottom mirror 19 to successively scan the three strip holograms 11a, 12a and 13a of the transmission type which are different in direction from each other. The laser beams 28e and 28f diffracted by any of the transmission type strip holograms 11a, 12a and 13a are projected as scanning lines of predetermined directions, and a desired scanning pattern is formed by such laser beams 28e and 28f.

On the other hand, as shown in FIG. 2B, signal light from a bar code affixed to a commodity is diffracted by the reading window 10 and introduced to the bottom mirror 19 and then reflected successively by the bottom mirror 19, side mirror 16 and polygon mirror 23 so that it is introduced to the concave mirror 18. The scattered light signal is condensed and reflected by the concave mirror 18 and then introduced by way of the mirror 21 into and detected by the photo-detector 20.

With the optical scanner having such a construction as described above, since a laser beam is projected from the reading window 10 such that a plurality of scanning lines having different directions may intersect each other in every plane above the reading window 10, no distance is required between the reading window and a bar code to be read. Consequently, reduction in thickness of the apparatus can be attained.

However, the optical scanner disclosed in U.S. Pat. No. 4,848,862 necessitates three horizontally divided side mirrors incorporated below the reading window in order to generate three scanning lines of different directions above the reading window. Since the two opposite side ones of the three side mirrors are disposed such that they extend outwardly of the reading window, the outer profile of the optical scanner apparatus must be made greater than the size of the reading window. Accordingly, the optical scanner is disadvantageous is that the entire apparatus cannot be made compact sufficiently. Besides, since the optical scanner has a two-story structure wherein the centrally located side mirror is disposed on the concave mirror, it is disadvantageous in that the entire apparatus cannot be reduced in thickness sufficiently.

SUMMARY OF THE INVENTION

Accordingly, it is an object of the present invention to provide an optical scanner which overcomes such drawbacks of the prior art apparatus as described above and enables attainment of sufficient miniaturization of the apparatus.

According to one aspect of the present invention, there is provided an optical scanner having a reading window which contains strip holograms and adapted to produce a plurality of scanning lines on the reading window, which comprises a light source for generating a laser beam; a scanning pattern generating means for scanning the laser beam so as to make a plurality of parallel rows of horizontal scanning lines a plurality of strip holograms of the reflection type disposed corresponding to the plurality of rows for diffracting the incident laser beam in different directions to produce the plurality of scanning lines on the reading window; a photo-detector for detecting scattered signal light scattered by an object to be read which is positioned in the neighborhood of the reading window; and means for deflecting and condensing the scattered signal light to the photo-detector.

Preferably, the scanning means includes a polygon mirror which is driven to rotate around an axis of rotation and which has a plurality of reflecting faces each adjacent ones of which are disposed at different angles with respect to the axis of rotation so as to produce the plurality of parallel rows of horizontal scanning lines.

According to another aspect of the present invention, there is provided an optical scanner having a reading window and adapted to produce a plurality of scanning lines on the reading window, which comprises a light source for generating a laser beam; a polygon mirror driven to rotate for scanning the laser beam linearly; a scanning pattern generating means for deflecting the laser beam reflected by the polygon mirror to produce a scanning pattern formed from a plurality of scanning lines on the reading window, the scanning pattern generating means including at least two holograms of the reflection type disposed in a spaced relationship from each other; a photo-detector for detecting scattered signal light scattered by an object to be read which is positioned in the neighborhood of the reading window; and means for deflecting and condensing the scattered light to the photo-detector.

Preferably, the scanning pattern generating means includes a plane mirror disposed at a central portion thereof, and a pair of holograms of the reflection type disposed at the opposite ends of the plane mirror in an opposing relationship to each other and in a substantially perpendicular relationship to the plane mirror.

According to a further aspect of the present invention, there is provided an optical scanner including a light source for generating a laser beam, a polygon mirror driven to rotate for linearly scanning the laser beam, a reading window, a scanning pattern generating means for deflecting the laser beam reflected by the polygon mirror to produce a scanning pattern formed from a plurality of scanning lines on the reading window, a photo-detector for detecting scattered signal light scattered by an object to be read which is positioned in the neighborhood of the reading window, and a light condensing means for deflecting and condensing the scattered signal light to the photo-detector: wherein the scanning pattern generating means is formed from a plurality of plane mirrors; and the light condensing means and at least one of the plane mirrors are integrated with each other to form a hologram module of the reflection type.

In place of the construction of the hologram module of the reflection type described above, the light condensing means may be constituted from a hologram of the reflection type disposed in a parallel, opposing relationship to the reading window and having a light condensing function. Meanwhile, the scanning pattern generating means may be constituted from a plurality of holograms of the reflection type disposed in a parallel, opposing relationship to the reading window.

Alternatively, the scanning pattern generating means may be constituted from a plurality of first holograms of a reflection type disposed in a parallel, opposing relationship to the reading window while the light condensing means is constituted from a second hologram of a reflection type disposed in a parallel, opposing relationship to the reading window and having a light condensing function.

The above and other objects, features and advantages of the present invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
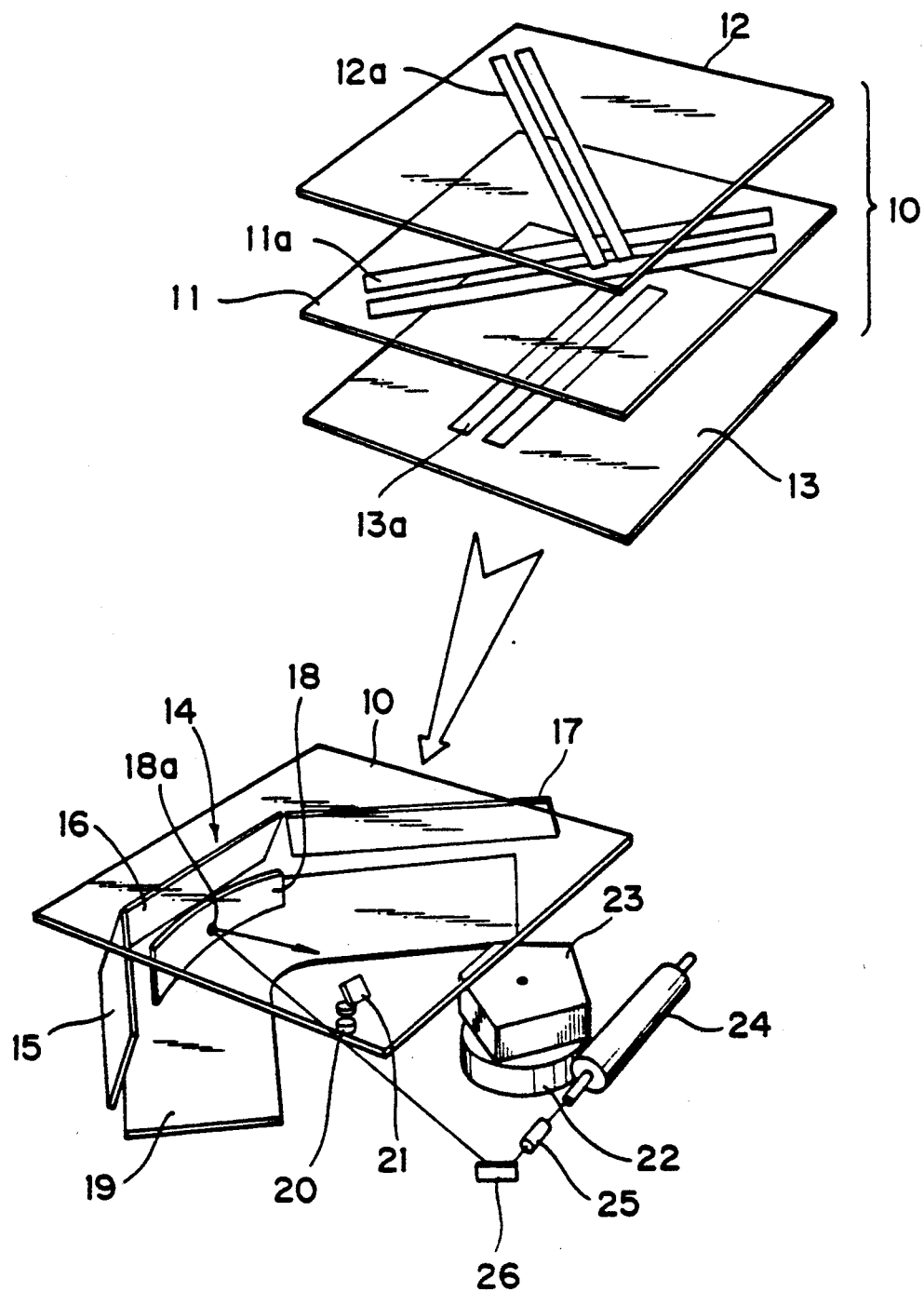
FIG. 1 is an exploded perspective view of a conventional optical scanner wherein holograms of the transmission type are used for a reading window.
Figure 2A:
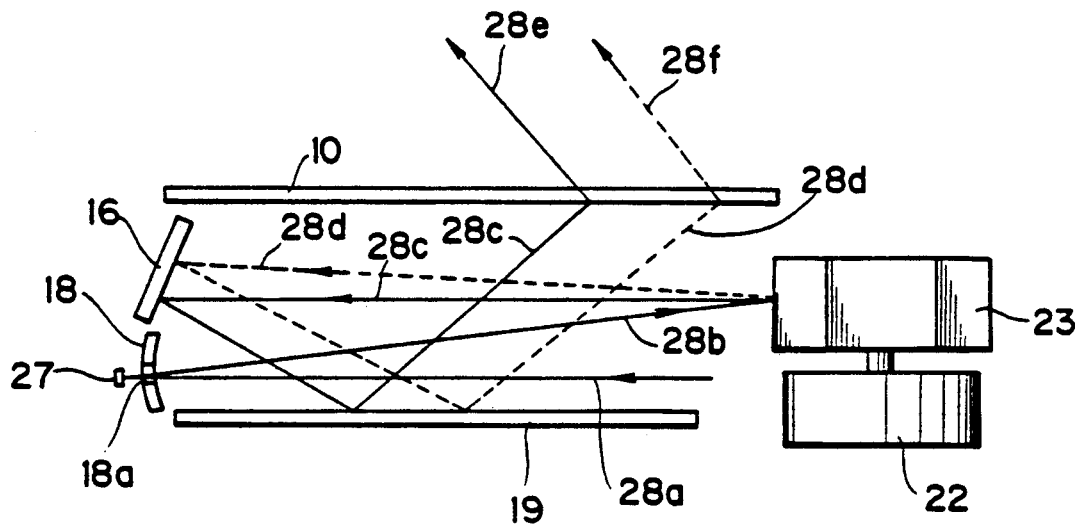
FIGS. 2A and 2B are schematic side elevational views illustrating light paths in the conventional optical scanner shown in FIG. 1.
Figure 2B:
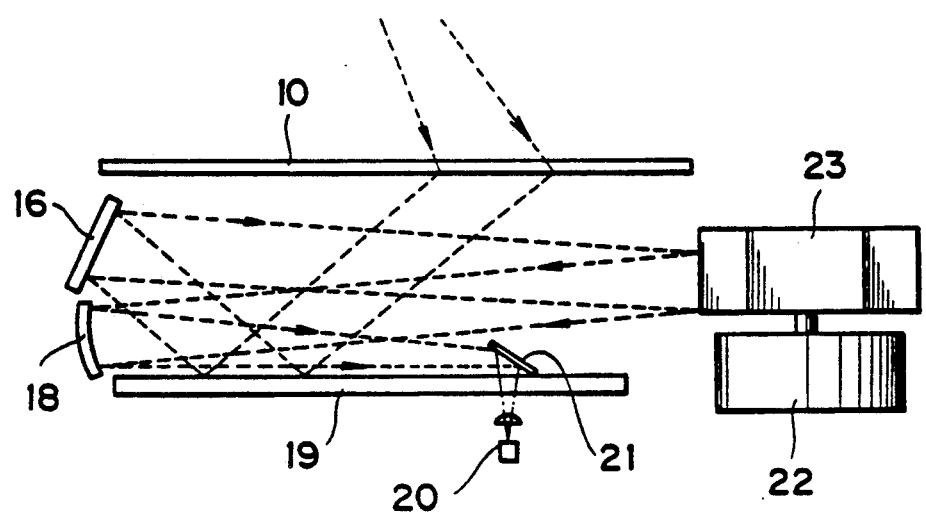
Figure 3:
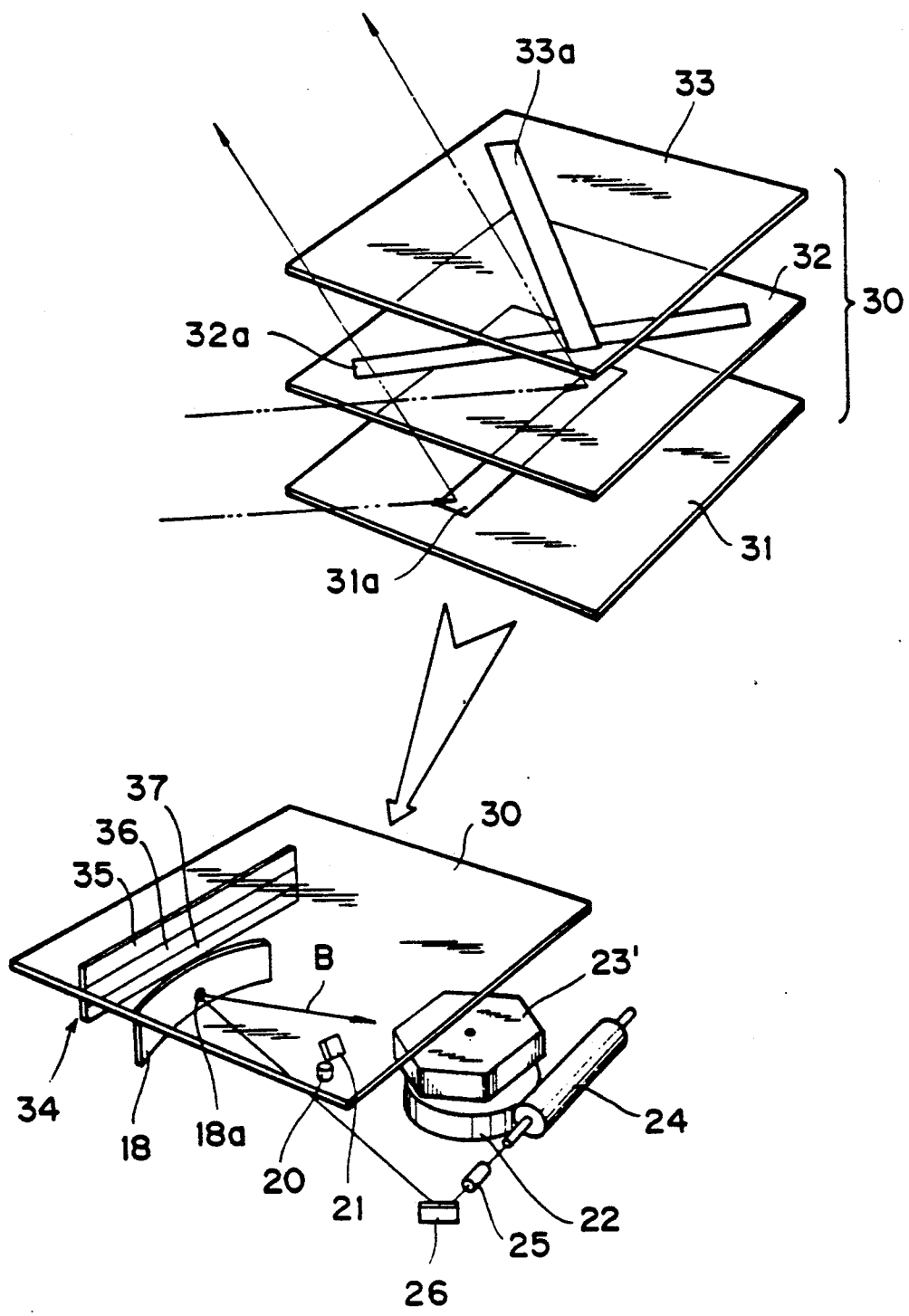
FIG. 3 is an exploded perspective view similar to FIG. 1 but showing a first embodiment of the present invention.
Figure 4:
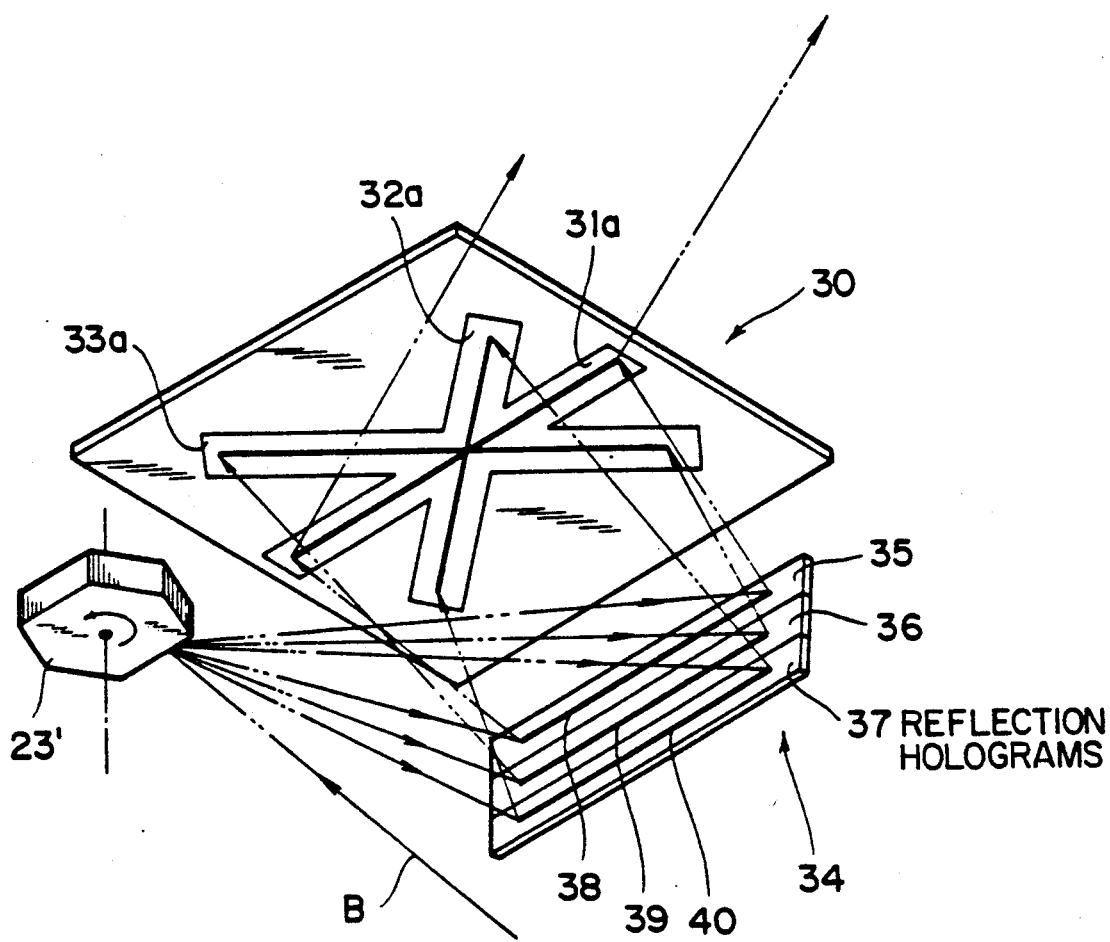
FIG. 4 is a perspective view showing principal parts of the optical scanner of the first embodiment of the present invention.

A first embodiment of the present invention will be described at first with reference to FIGS. 3 and 4. Referring first to FIG. 3, a hologram 34 of the reflection type for generation of a scanning pattern, a concave mirror 18 having a through-hole 18a formed therein and having a curved reflecting face, a photo-detector 20, a reflecting mirror 21, a polygon mirror 23' having six reflecting faces and connected to be driven to rotate by a motor 22, a He—Ne laser tube 24, a beam shaper 25 and another reflecting mirror 26 are disposed below a reading window 30 in a substantially similar configuration to that of the prior art apparatus shown in FIG. 1. In the optical scanner of the present embodiment, the scanning pattern generating mirror means 14 constituted from the three mirrors and the bottom mirror 19 of the prior art apparatus shown in FIG. 1 are replaced by the hologram 34 of the reflection type.

A laser beam is emitted from the He—Ne laser tube 24 and then shaped in beam diameter by the beam shaper 25, whereafter it is reflected toward the concave mirror 18 by the reflecting mirror 26. The laser beam is further reflected by a back mirror not shown disposed behind the through-hole 18a of the concave mirror 18 and thus introduced to the polygon mirror 23' which is being rotated by the motor 22.

The polygon mirror 23' has, for example, 6 reflecting faces, of which three adjacent ones are disposed at different angles from each other with respect to an axis of rotation of the polygon mirror 23' such that a laser beam B introduced thereto in the same direction may be reflected therefrom at somewhat different emergent angles from each other in a vertical direction so that it may successively scan, within a range of the same deflection angle, strip holograms 35, 36 and 37 provided in three layers or stages on the hologram 34 of the reflection type.

The reflection type hologram 34 for generation of a scanning pattern is constituted such that the three strip holograms 35, 36 and 37 of the reflection type having different diffracting directions from each other are disposed in a vertically overlapping relationship in the same vertical plane, and each of the strip holograms 35, 36 and 37 has interference fringes formed therein such that they may diffract a scanning beam introduced thereto from the polygon mirror 23' so as to irradiate the scanning beam upon strip holograms 31a, 32a and 33a of the transmission type of the reading window 30 from below. In producing a hologram of the reflection type, a reference beam is introduced to one face of a photographic plate in the same direction with a laser beam which is to be used upon reproduction of a hologram while an object beam is introduced to the other face of the photographic plate in such a direction that a desired scanning line may be formed on the reading window upon reproduction of the hologram. With the method, a hologram of the reflection type having an arbitrary diffraction angle can be produced.

The reading window 30 is constituted such that three glass plates 31, 32 and 33 having thereon the strip holograms 31a, 32a and 33a of the transmission type having different directions are placed in layers such that the strip holograms 31a, 32a and 33a may extend in an intersecting relationship with each other. The reading window 30 thus diffracts a laser beam introduced thereto in a predetermined direction from below a lower face thereof and passes the laser beam therethrough to an upper face thereof so that it may project a scanning laser beam in a predetermined scanning pattern to the upper side of the reading window 30. In producing a hologram of the transmission type, an object beam and a reference beam are introduced to a face of a photographic plate in the same direction of the photographic plate. An arbitrary diffraction angle can be obtained by changing the irradiating direction of such object beam.

Subsequently, an operation of the hologram 34 of the reflection type which is a characteristic of the present embodiment will be described with reference to FIG. 4. When scanning beams are successively irradiated upon the plurality of stages of strip holograms 35, 36 and 37 from the polygon mirror 23' which is being driven to rotate by the motor 22, the scanning beams are diffracted at different angles from each other by the strip holograms 35, 36 and 37 so that they scan the reading window 30 in a predetermined scanning pattern in such a manner as described below.

In the embodiment shown, when the strip hologram 35 on the upper stage is scanned as along a scanning line 38 by the scanning beam from one of the reflecting faces of the polygon mirror 23', the laser beam diffracted by the strip hologram 35 of the reflection type and reflected obliquely upwardly scans the strip hologram 31a of the transmission type of the reading window 30 along a scanning line substantially parallel to the plane of the hologram 34 of the reflection type. Subsequently, when the strip hologram 36 of the reflection type on the middle stage is scanned as along another scanning line 39 by the scanning beam from a next one of the reflecting faces of the polygon mirror 23', the laser beam is reflected in a somewhat twisted condition by the strip hologram 36 of the reflection type so that it scans the inclined strip hologram 33a of the transmission type on the reading window 30. Further, when the strip hologram 37 of the reflection type on the lower stage is scanned as along a further scanning line 40 by the scanning beam reflected by a third reflecting face of the polygon mirror 23', the laser beam is reflected in a reversely twisted condition to that of the case of the scanning beam from the strip hologram 36 on the middle stage described above so that it scans the strip hologram 32a of the transmission type of the reading window 30.

On the other hand, scattered signal light from a bar code passes the light path reversely to the scanning beam and is thus introduced to the hologram 34 of the reflection type from the reading window 30 so that it is diffracted to the polygon mirror 23' by the hologram 34 of the reflection type. The scattered signal light is further reflected toward the concave mirror 18 by the polygon mirror 23'. Since the signal light has some expansion as different from a scanning beam, it is condensed by and reflected from the concave mirror 18 having a wide reflecting area. The signal light is further reflected by the mirror 21, and then detected by the photo-detector 20 provided at the position of the focus of the concave mirror 18.

Such construction described above enables elimination of the opposite side mirrors and the bottom mirror which are necessitated by the prior art apparatus described above, and thus enables attainment of miniaturization of the entire apparatus.

Figure 5:
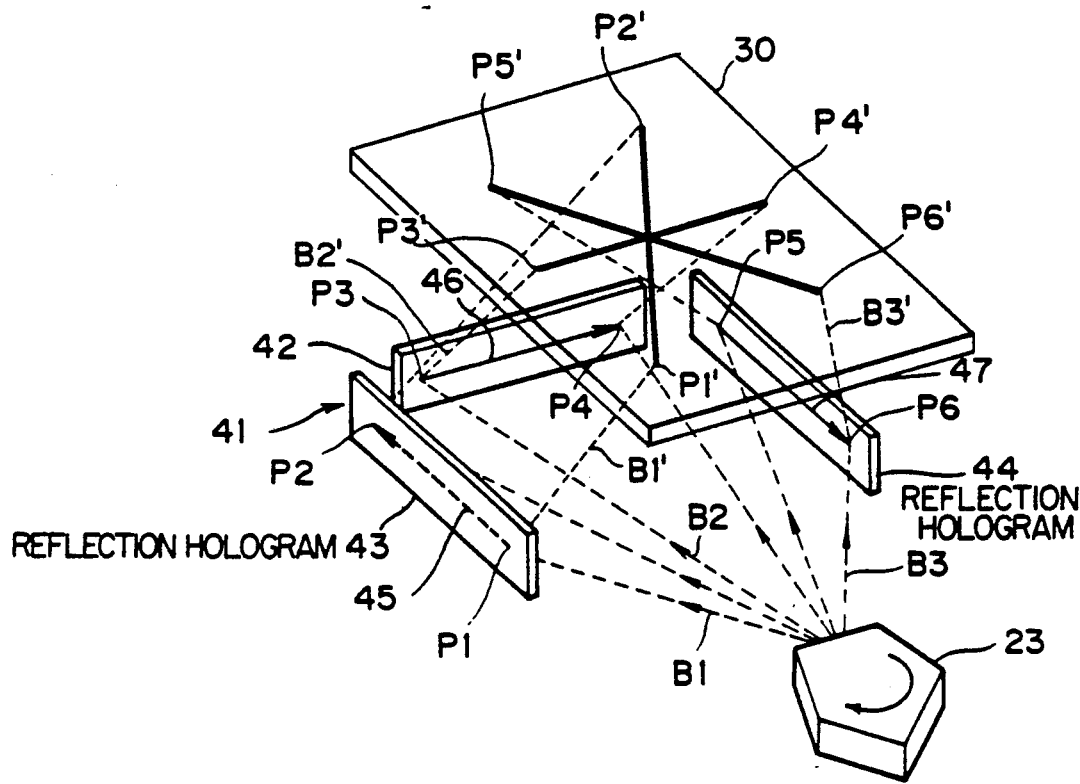
FIG. 5 is a schematic perspective view showing a second embodiment of the present invention with a concave mirror omitted.

Subsequently, a second embodiment of the present invention will be described with reference to FIGS. 5 and 6. In the present embodiment, substantially like parts or elements are denoted by like reference characters to those of the first embodiment described above, and overlapping description thereof is omitted herein to avoid redundancy. The present embodiment is characterized in that a scanning pattern generating mirror means 41 is composed of a plane mirror 42 disposed at the center and a pair of holograms 43 and 44 of the reflection type disposed at the opposite ends of the plane mirror 42 in an opposing relationship to each other perpendicularly to the plane mirror 42.

A laser beam reflected by the polygon mirror 23 at first scans a surface of the hologram 43 of the reflection type in the direction indicated by a broken line arrow mark 45 and then scans a surface of the plane mirror 42 in the direction indicated by a solid line arrow mark 46, whereafter it scans a surface of the hologram 44 of the reflection type in the direction indicated by another solid line arrow mark 47.

Here, the hologram 43 of the reflection type has interference fringes formed thereon such that a diffracted beam B1' obtained from the laser beam B1 which irradiates from a point P1 to another point P2 upon the hologram 43 of the reflection type may scan the reading window 30 from a point P1' to another point P2'. Meanwhile, the plane mirror 42 is disposed such that a reflected beam B2' obtained from the laser beam B2 which irradiates from a point P3 to another point P4 may scan the reading window 30 from a point P3' to another point P4'. On the other hand, the hologram 44 of the reflection type has interference fringes formed thereon such that a diffracted beam B3' obtained from the laser beam B3 which irradiates from a point P5 to another point P6 may scan the reading window 30 from a point P5' to another point P6'.

Figure 6:
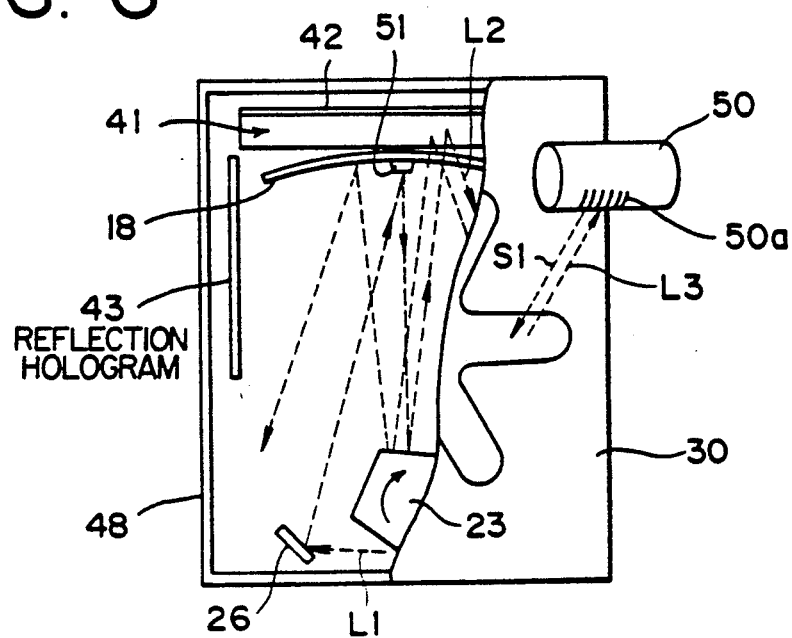
FIG. 6 is a plan view, partly broken, of the second embodiment of the present invention.

Referring to FIG. 6, various parts including a concave mirror 18, the polygon mirror 23 and the scanning pattern generating mirror means 41 are disposed in a housing 48, and a bar code 50a is applied to a commodity 50 at a location above the reading window 30.

Here, a laser beam L1 indicated by a broken line after having been shaped by a beam shaper not shown is reflected at first by a mirror 26 and then by a small mirror 51 provided on the concave mirror 18 and is thus introduced to the polygon mirror 23. Then, the laser beam reflected by the polygon mirror 23 is either diffracted or reflected by one of the reflection type hologram 43, plane mirror 42 and reflection type hologram 44 which constitute the scanning pattern generating mirror means 41 to form laser beams L2. The laser beams L2 are further diffracted by the reading window 30 and are then projected from the reading window 30 as laser beams L3 and scan the bar code 50a of the commodity 50.

On the other hand, scattered signal light S1 indicated by a broken line from the bar code 50a passes the substantially same light path with the incident light but in the reverse direction so that it is introduced to the concave mirror 18. After the scattered signal light S1 is reflected by the concave mirror 18, it is focused at a photo-detector not shown so that the bar code 50a is read by the photo-detector.

With the optical scanner having such a construction as described above, since the scanning pattern generating mirror means 41 is constituted from the holograms 43 and 44 of the reflection type and the plane mirror 42 which are disposed in a U-shaped configuration, the apparatus can be reduced in overall size. The plane mirror 42 may be naturally replaced by a hologram of the reflection type.

In the following, a third embodiment of the present invention will be described with reference to FIGS. 7, 8A and 8B. In the present embodiment, substantially like parts or elements are denoted by like reference characters to those of the first embodiment and the prior art device of FIG. 1 described above, and overlapping description thereof is omitted herein to avoid redundancy.

The present embodiment has a substantially similar construction to that of the prior art apparatus shown in FIG. 1 except that the centrally positioned one 16 of the three mirrors which constitute the scanning pattern generating mirror means 14 of the prior art apparatus shown in FIG. 1 and the concave mirror 18 positioned below the mirror 16 are integrated into a unitary hologram module 52 of the reflection type.

Figure 7:
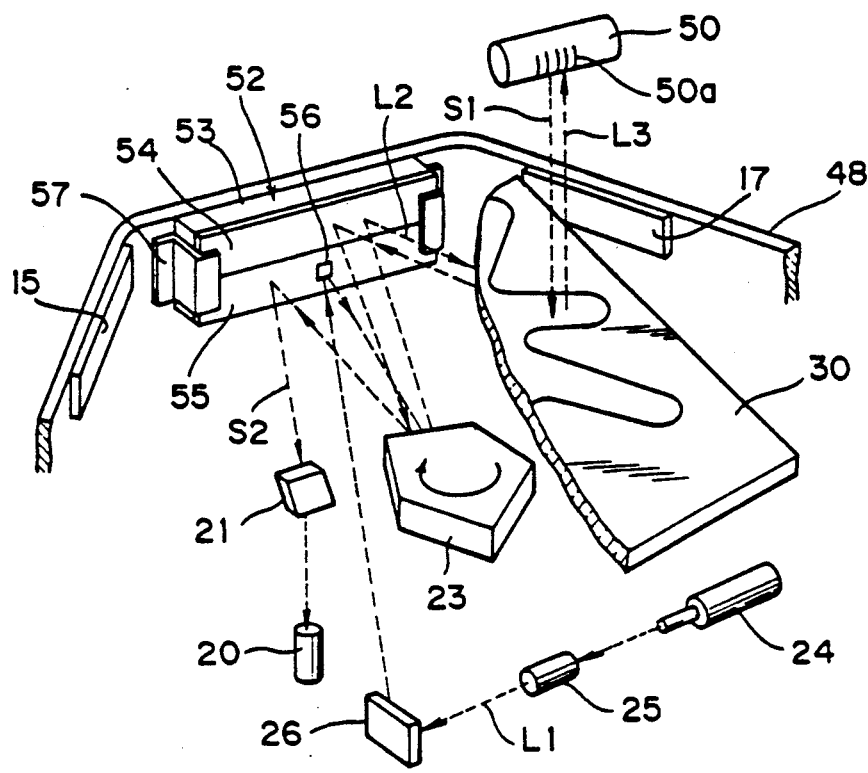
FIG. 7 is a schematic perspective view, partly broken, of a third embodiment of the present invention.

Referring to FIG. 7, the hologram module 52 of the reflection type is constituted such that a hologram 54 of the reflection type having a predetermined mirror function is formed on the upper half area of a transparent substrate 53 made of glass or the like while a hologram 55 of the reflection type having a predetermined concave mirror function is formed on the lower half area of the transparent substrate 53. A small plane mirror 56 is mounted at a central location of the hologram 55 of the reflection type having a concave mirror function. The hologram module 52 of the reflection type is secured to a housing 48 by means of a pair of fixing members 57.

Subsequently, processes of forming a hologram will be described with reference to FIGS. 8A and 8B. FIG. 8A illustrates an example of formation of a hologram of the reflection type having an ordinary mirror function and a light beam converging function while FIG. 8B illustrates an example of formation of a hologram of the reflection type having a concave mirror function. In either case, a photosensitive film 58 consisting of gelatine mixed with silver and having a thickness of several $\mu m$ is formed on a transparent substrate 53 made of glass or the like.

Figure 8A:
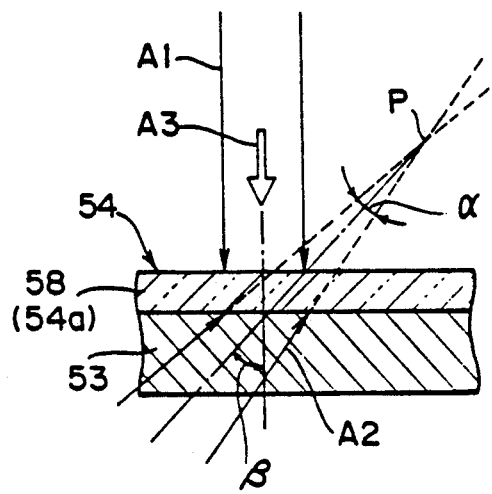
FIG. 8A is a schematic view illustrating a method of forming a hologram of the reflection type having an ordinary mirror function and a laser beam condensing function.

In forming the hologram 54 of the reflection type having a mirror function, a laser beam A1 of a collimated plane wave is irradiated vertically upon the photosensitive film 58 shown in FIG. 8A while another laser beam A2 of a converging spherical wave which converges at a predetermined angle $\alpha$ is irradiated at another predetermined angle $\beta$ from the side of the transparent substrate 53. Subsequently, developing processing and fixing processing are performed in accordance with an ordinary method to form a hologram film 54 on the photosensitive film 58.

With the hologram 54 of the reflection type formed in this manner, a laser beam A3 incident in the same direction with the laser beam A1 is converted by the hologram film 54a into a diffracted beam A3', which advances in the direction of the light path of the laser beam 42. Thus, the diffracted beam A3' is focused at a point P and thereafer advances rectilinearly. On the other hand, a laser beam which advances reversely along the light path of the diffracted beam A3' is diffracted by the hologram film 54a and then advanced reversely along the light path of the laser beam A3. Accordingly, the hologram 54 can be provided with a function as a plane mirror satisfying a predetermined condition by suitably selecting the converging angle $\alpha$ and the incident angle $\beta$ of the laser beam A2.

Figure 8B:
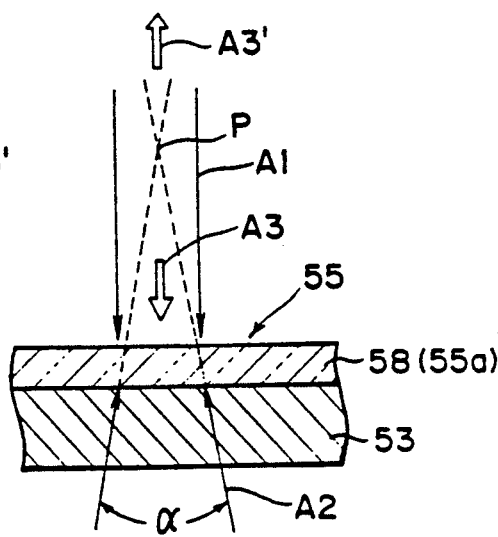
FIG. 8B is a schematic view illustrating a method of forming a hologram of the reflection type having a concave mirror function.

Meanwhile, in forming the hologram 55 of the reflection type having a concave mirror function, a laser beam A1 of a collimated plane wave is irradiated vertically upon the photosensitive film 58 while another laser beam A2 of a spherical wave having a converging angle $\alpha$ is irradiated perpendicularly upon the transparent substrate 53 from the side of the transparent substrate 53 as shown in FIG. 8B. After then, developing and fixing processing is performed in accordance with an ordinary method to form a hologram film 55a on the photosensitive film 58.

With the hologram 55 of the reflection type formed in this manner, a laser beam A3 incident in the direction of the laser beam A1 described above is diffracted by the hologram film 55a into a diffracted beam A3', which then advances along the light path of the laser beam A1 but in the reverse direction and is thus focused at the point P whereafter it advances straightforwardly. On the other hand, a laser beam which advances reversely along the light path of the diffracted laser beam A3' is diffracted by the hologram film 55a and then advances reversely along the light path of the laser beam A3. Accordingly, a hologram of the reflection type having a function as a concave mirror having an arbitrary distance to the focal point P can be formed by suitably selecting the convergent angle $\alpha$ of the laser beam A2.

In the following, light paths in the present embodiment will be described briefly.

A laser beam L1 emitted from a laser tube 24 and shaped to have a predetermined diameter by a beam shaper 25 is reflected at first by a mirror 26 and then by the small mirror 56 provided on the hologram 55 of the reflection type and is introduced to the polygon mirror 23. Since the polygon mirror 23 is being rotated at a high speed, the laser beam introduced to the polygon mirror 23 from the small mirror 56 and reflected by the polygon mirror 23 is then reflected or diffracted by the scanning pattern generating mirror 15, reflection type hologram 54 or scanning pattern generating mirror 17 while successively scanning surfaces of them so that it makes laser beams L2 which advance toward the reading window 30. After then, the laser beams L2 are projected from the reading window 30 as diffracted laser beams L3, which scan a bar code 50a of a commodity 50 disposed above the reading window 30.

On the other hand, scattered signal light S1 from the bar code 50a advances reversely along the substantially same light path with the incident beam and is introduced to the hologram 55 of the reflection type having a concave mirror function, and then diffracted light S2 from the hologram 55 of the reflection type is condensed by way of a mirror 21 to a photo-detector 20 so that the bar code information is read by the photo-detector 20.

With the optical scanner having such a construction as described above, a scanning pattern generating mirror and a concave mirror which are conventionally required to be adjusted independently of each other are replaced by the reflection type hologram module 52 having an equivalent function. Consequently, assembly of those parts to the housing 48 is facilitated, and the number of man-hours for adjustment as an entire apparatus can be reduced significantly.

Subsequently, a fourth embodiment of the present invention will be described with reference to FIGS. 9, 10A and 10B. The present embodiment is characterized in that a bottom mirror which is disposed on a bottom of the apparatus in a parallel, opposing relationship to a reading window is constructed in an integrated relationship to a hologram of the reflection type having a light converging function. Since such construction eliminates the necessity of a concave mirror which is required for the prior art apparatus, miniaturization of the apparatus can be attained.

Figure 9:
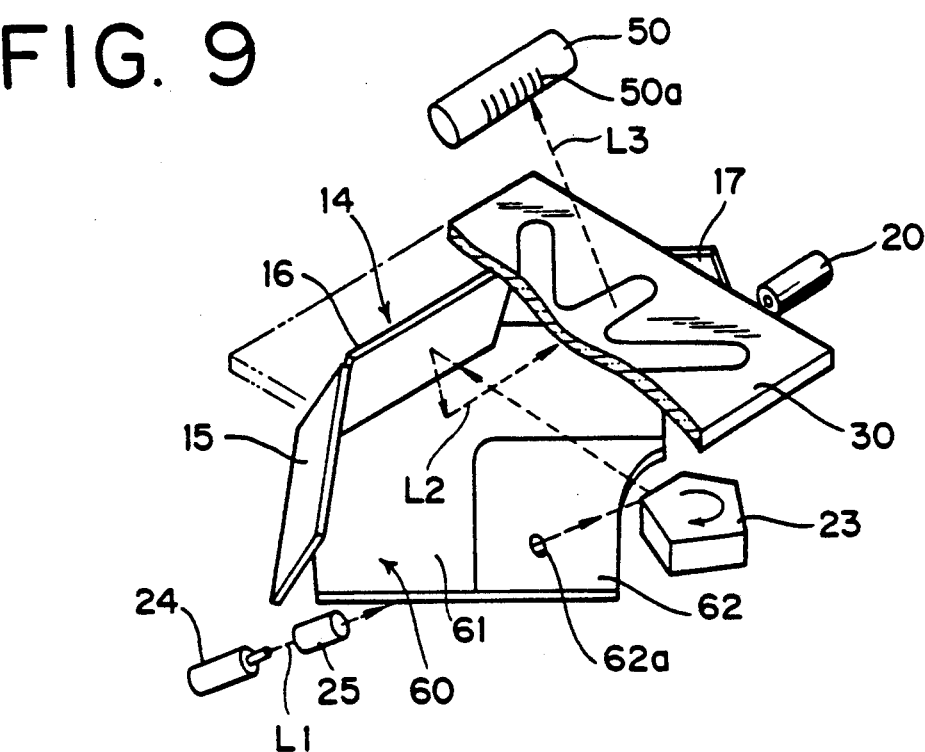
FIG. 9 is a schematic perspective view, partly broken, of a fourth embodiment of the present invention.

Referring to FIG. 9, a bottom optical plate 60 is disposed in parallel to a reading window 30. The bottom optical plate 60 is constituted such that a hologram 62 of the reflection type having a predetermined diffracting function and a predetermined light converging function is adhered to a bottom mirror 61. The hologram 62 of the reflection type has a through-hole 62a formed therein for passing a laser beam L1 from a laser tube 24 therethrough. While the construction of the other components of the present embodiment is different a little in configuration, it is substantially similar to that of the prior art apparatus shown in FIG. 1, and like parts are denoted by like reference numerals and description thereof is omitted herein to avoid redundancy.

Figure 10A:
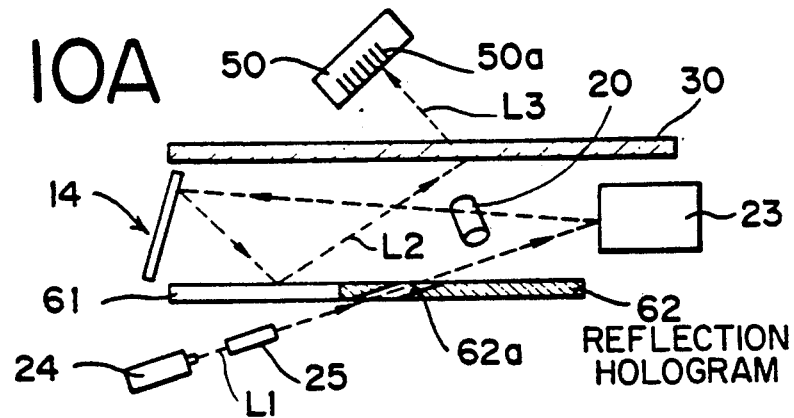
FIG. 10A is a schematic side elevational view illustrating a light path of a scanning laser beam in the fourth embodiment of the present invention.

Referring to FIG. 10A, there is shown a laser beam scanning light path. A laser beam L1 emitted from the laser tube 24 passes through the through-hole 62a formed in the hologram 62 of the reflection type constituting the bottom optical plate 60 and is introduced to the polygon mirror 23 so that it is scanned by the polygon mirror 23. After then, the laser beam L1 is successively reflected by the scanning pattern generating mirror means 14 and the bottom mirror 61 and then diffracted by any of strip holograms of the transmission type provided on the reading window 30 to form a beam L3, which then scans a bar code 50a applied to a commodity 50.

Figure 10B:
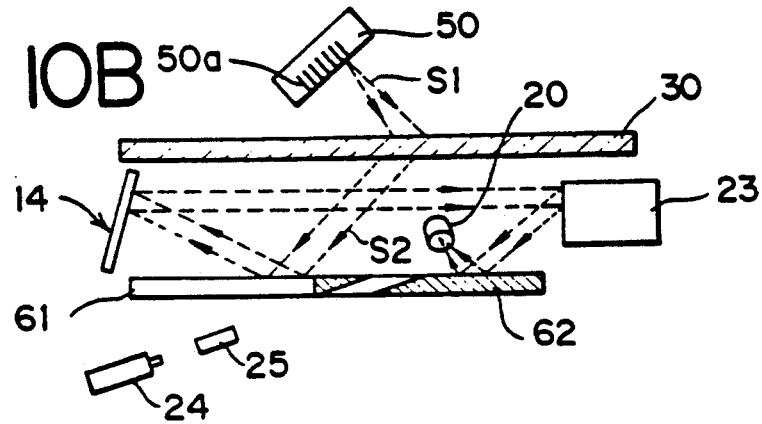
FIG. 10B is a schematic side elevational view illustrating light paths of scattered signal light in the fourth embodiment of the present invention.

Referring now to FIG. 10B, there are shown returning signal light paths. Scattered signal light S1 from the bar code 50a is diffracted by the reading window 50a to form signal light S2, which then advances reversely along the substantially same light path with the incident beam so that it comes to a location near the through-hole 62a of the bottom optical plate 60. There, since the hologram 62 of the reflection type having a light converging function is provided in an area of the location to which the signal light S2 comes, the signal light S2 is diffracted in a predetermined direction. Then, the signal light S2 is focused to the photo-detector 20 so that information of the bar code 50a is read by the photo-detector 20.

With the optical scanner having such a construction as described above, since the bottom optical plate 60 has functions as a conventional bottom mirror and a conventional concave mirror, a concave mirror which is required in the prior art apparatus is unnecessary. As a result, the entire apparatus can be constructed with a reduced thickness.

Figure 11:
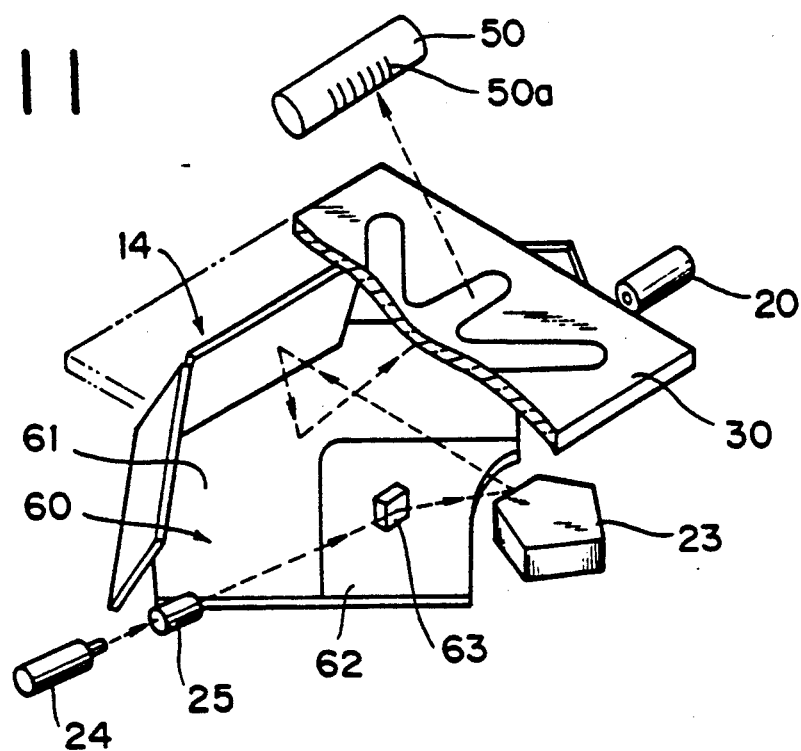
FIG. 11 is a schematic perspective view, partly broken, of a fifth embodiment of the present invention.
Figure 12A:
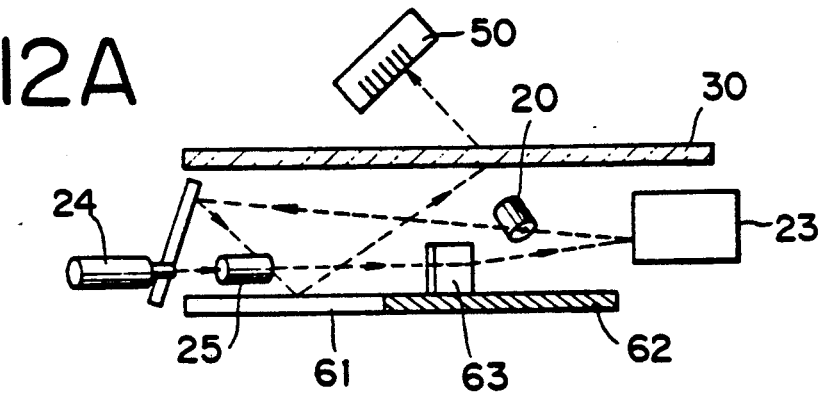
FIG. 12A is a schematic side elevational view illustrating a light path of a scanning laser beam in the fifth embodiment mentioned above.
Figure 12B:
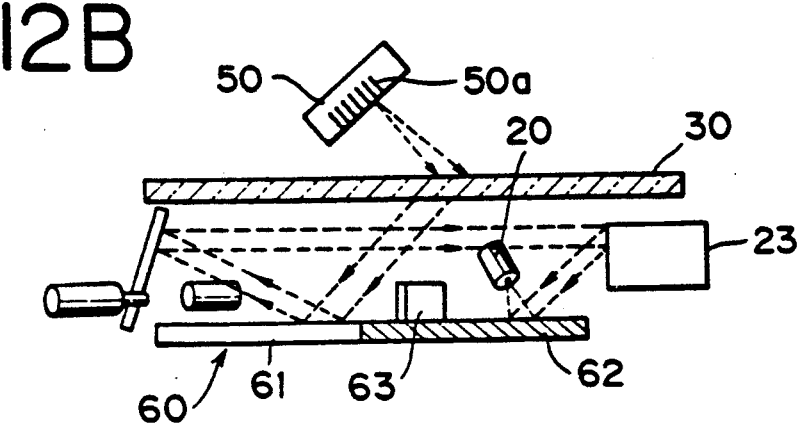
FIG. 12B is a schematic side elevational view illustrating light paths of scattered signal light in the fifth embodiment mentioned above.

Referring now to FIG. 11, there is shown a fifth embodiment of the present invention. The present embodiment is substantially same in construction with the fourth embodiment of the present invention except that a plane mirror 63 is provided on a hologram 62 of the reflection type. In the present embodiment, since a laser tube 24 and a beam shaper 25 can be disposed between a reading window 30 and a bottom optical plate 60, the entire apparatus can be further reduced comparing with the fourth embodiment.

In the following, a sixth embodiment of the present invention will be described with reference to FIGS. 13, 14A and 14B. The present embodiment is characterized in that the scanning pattern generating mirror means 14 of the prior art apparatus shown in FIG. 1 is replaced by a scanning pattern generating hologram 65 composed of three holograms 66, 67 and 68 of the reflection type all disposed in parallel to a reading window 30. Since the other construction of the present embodiment is substantially same with the prior art apparatus shown in FIG. 1, like parts are denoted by like reference characters and description thereof is omitted herein.

Figure 13:
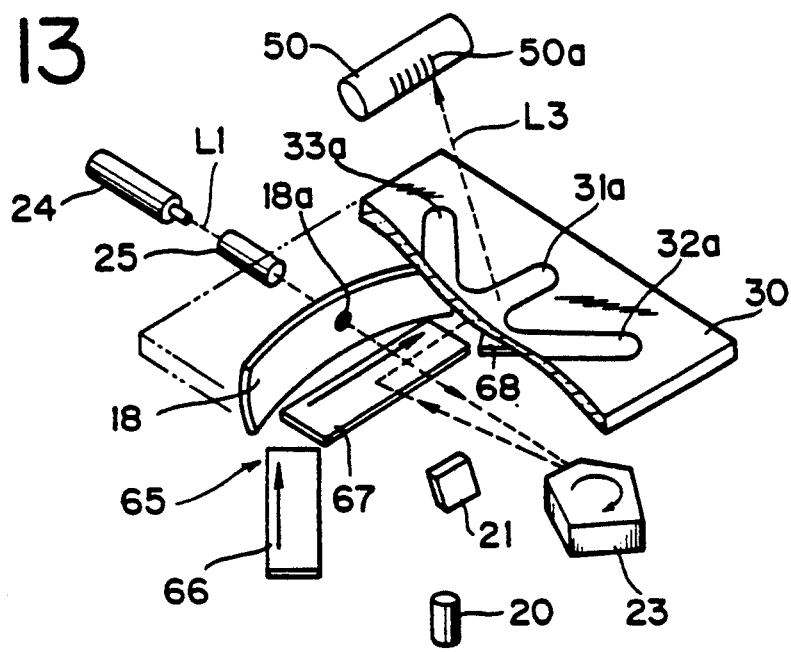
FIG. 13 is a schematic perspective view, partly broken, of a sixth embodiment of the present invention.
Figure 14A:
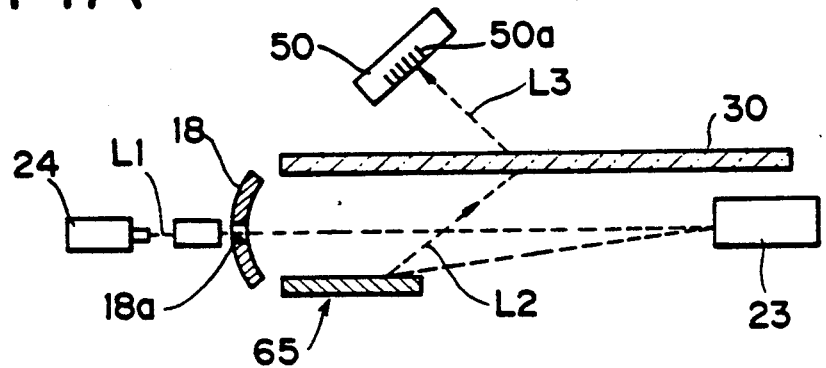
FIG. 14A is a schematic side elevational view illustrating a light path of a scanning laser beam in the sixth embodiment mentioned above.

Referring to FIGS. 13 and 14A, paths of a scanning laser beam will be described. A laser beam L1 emitted from a laser tube 24 is at first beam shaped by a beam shaper 25 and then introduced to a rotating polygon mirror 23 by way of a through-hole 18a formed in a concave mirror 18. Since the polygon mirror 23 is being rotated at a high speed, the laser beam scans, after reflected by the polygon mirror 23, the holograms 66, 67 and 68 of the reflection type disposed in parallel to the reading window 30 and constituting the scanning pattern generating hologram 65 as shown in FIG. 13 successively in the direction indicated by arrow marks in FIG. 14A. The laser beams L2 diffracted by the scanning pattern generating hologram 65 are introduced to strip holograms 31a, 32a and 33a of the transmission type provided on the reading window 30 and thus diffracted by the strip holograms to form laser beams L3, which then scan a bar code 50a applied to a commodity 50.

Figure 14B:
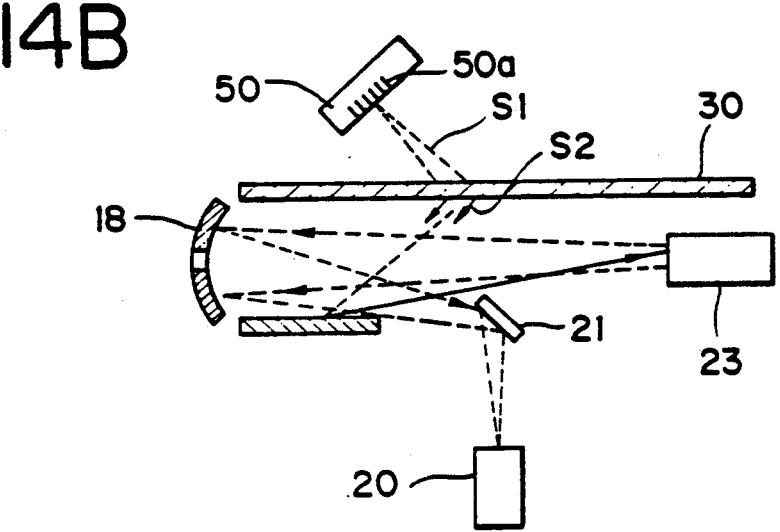
FIG. 14B is a schematic side elevational view illustrating light paths of scattered signal light in the sixth embodiment mentioned above.

In the meantime, scattered signal light S1 from the bar code 50a is introduced to the reading window 30 as shown in FIG. 14B to form diffracted signal light S2, which advances into the inside of the apparatus. After then, the diffracted signal light S2 advances reversely along the substantially same path with the scanning laser beam and is introduced to the concave mirror 18, and the signal light reflected by the concave mirror 18 is condensed to the photo-detector 20 so that information of the bar code 50a is read by the photo-detector 20.

With the optical scanner having such a construction as described above, since the scanning pattern generating mirror means of the prior art apparatus shown in FIG. 1 is replaced by the scanning pattern generating hologram 65 disposed in parallel to the reading window 30, the entire apparatus can be formed with a reduced thickness, and the number of man-hours for adjustment of an optical axis of the scanning pattern generating mirror means in the prior art apparatus can be reduced.

Figure 15:
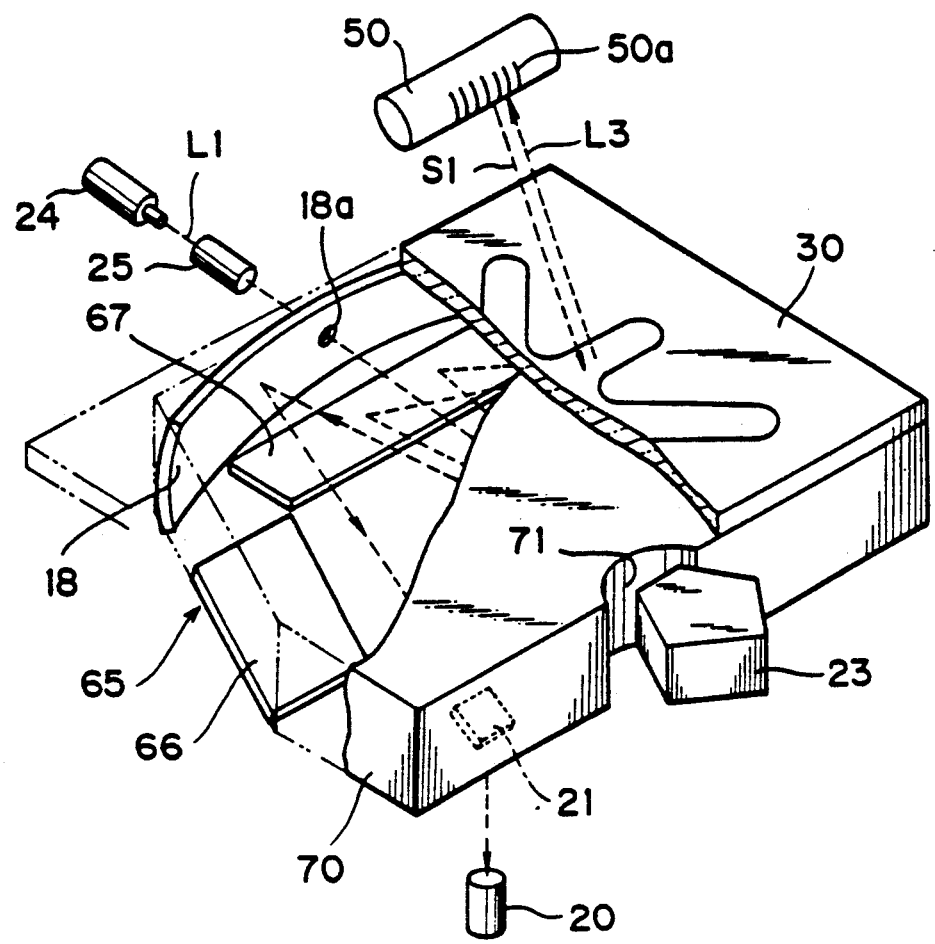
FIG. 15 is a schematic perspective view, partly broken, of a seventh embodiment of the present invention.
Figure 16:
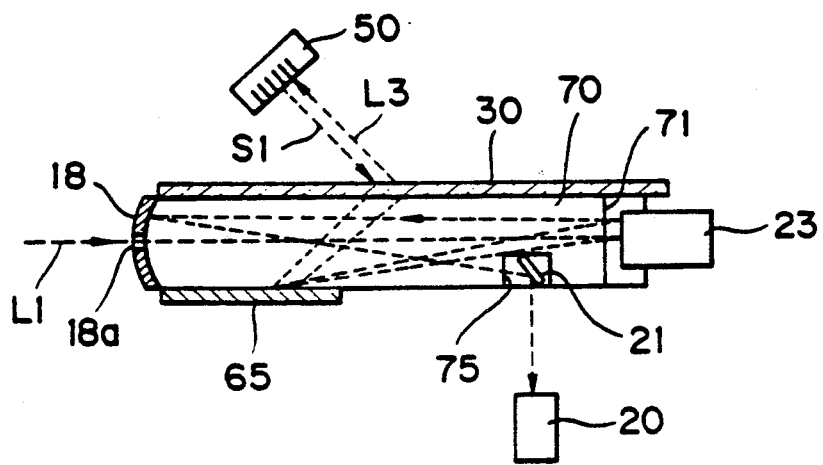
FIG. 16 is a schematic side elevational view illustrating a light path of a scanning laser beam and another light path of scattered signal light in the seventh embodiment mentioned above.

FIGS. 15 and 16 show a seventh embodiment of the present invention. The apparatus of the present embodiment includes all of the components of the apparatus of the sixth embodiment described above, and most of the components are adhered to a transparent block 70 in the form of a flat plate formed from an acrylic resin material, glass or the like. In particular, a reading window 30 having a plurality of strip holograms of the transmission type thereon is adhered to an upper face of the flat plate-formed transparent block 70, and holograms 66, 67 and 68 of the reflection type generally constituting a scanning pattern generating hologram 65 are adhered to a bottom face of the flat plate-formed transparent block 70. Meanwhile, a rear face of the transparent block 70 is formed into a concave spherical face corresponding to a concave mirror 18, and the concave mirror 18 is adhered to the concave spherical face portion of the transparent block 70. A pair of cavities 71 and 72 are formed at portions of the transparent block 70 at which the polygon mirror 23 and the reflecting mirror 21 are mounted on the transparent block 70.

Since operation of the present embodiment is similar to that of the sixth embodiment described above, description thereof is omitted herein. With the present embodiment, since most parts constituting the optical system are adhered in an integrated relationship to the transparent block in the form of a flat plate, there is no necessity of individually adjusting optical axes of the individual elements constituting the optical system, and accordingly, the number of man-hours for assembly can be reduced.

It has been confirmed that similar effects can be attained even if the concave mirror 18 is formed, instead of being adhered to the transparent block 70, as an aluminum film, for example, vapor deposited on the convex spherical portion of the transparent block 70.

Figure 17:
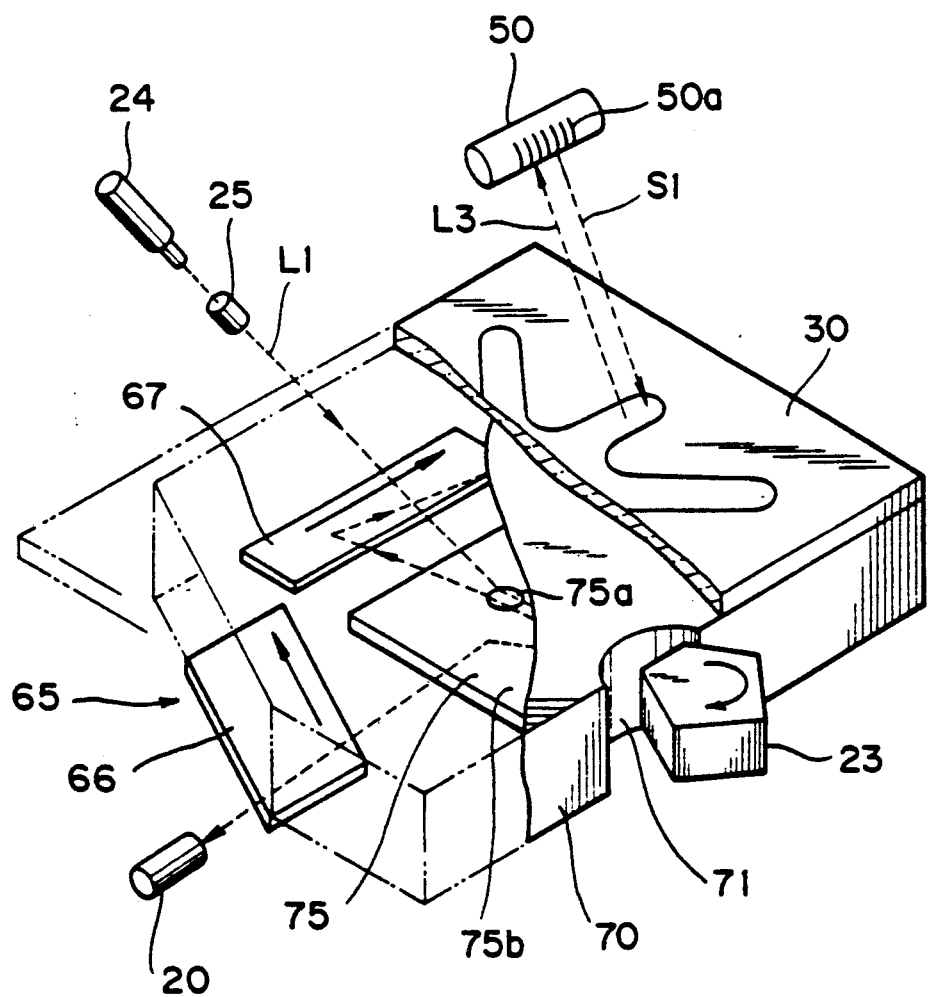
FIG. 17 is a schematic perspective view, partly broken, of an eighth embodiment of the present invention.
Figure 18:
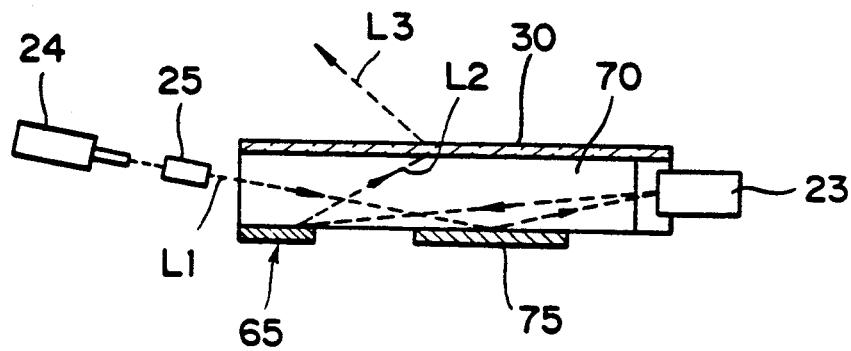
FIG. 18 is a side elevational view of the eighth embodiment of the present invention.
Figure 19:
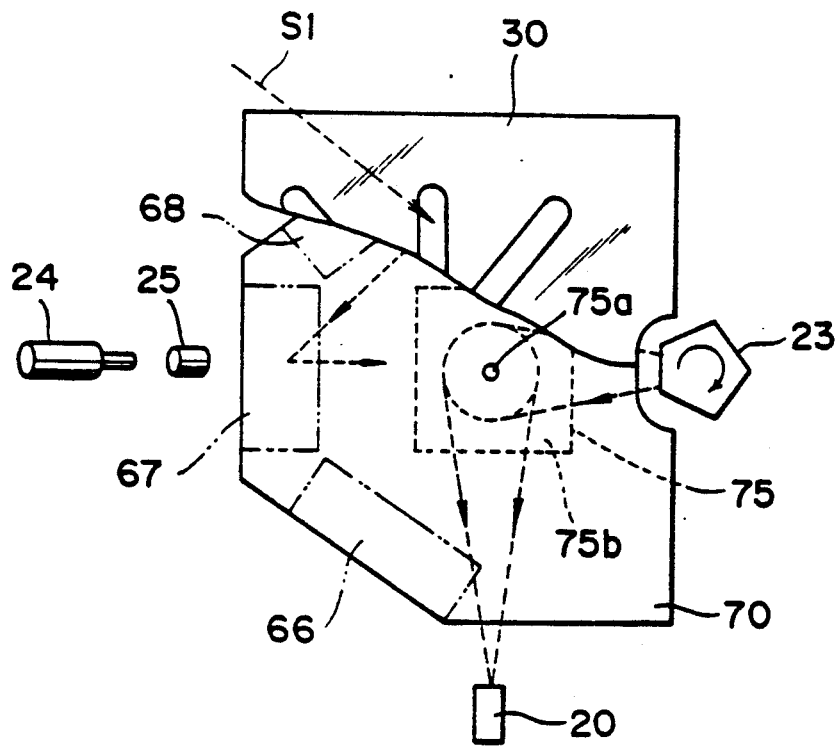
FIG. 19 is a plan view, partly broken, of the eighth embodiment of the present invention showing a relative positional relationship of various components.

Subsequently, an eighth embodiment of the present invention will be described with reference to FIGS. 17 to 19. The present embodiment is similar to the seventh embodiment shown in FIG. 15 and only different in that the concave mirror 18 adhered to the rear face of the transparent block 70 shown in FIG. 15 is replaced by a hologram 75 of the light condensing reflection type adhered to a bottom face of a transparent block 70. The hologram 75 of the light condensing reflection type is constituted such that a small area portion at a central location thereof makes an ordinary plane mirror 75a while a hologram 75b of the reflection type having a light converging function and a function of diffracting light from a polygon mirror 23 to a predetermined direction is provided on an entire face of the hologram 75 except the portion of the plane mirror 75a. Since the other construction is substantially similar to that of the seventh embodiment shown in FIG. 15, description thereof is omitted herein.

A laser beam L1 emitted from a laser tube 24 and shaped to a predetermined beam diameter by a beam shaper 25 is at first introduced to the transparent block 70 and then totally reflected by the plane mirror 75a of the hologram 75 of the light condensing reflection type so that it is introduced to the polygon mirror 23. Since the polygon mirror 23 is being rotated at a high speed in the direction indicated by an arrow mark in FIGS. 17 and 19, the reflected beams from the polygon mirror 23 scan the holograms 66, 67 and 68 of the reflection type constituting the scanning pattern generating hologram 65 successively in the direction indicated by arrow marks in FIG. 17. The diffracted beams L2 from the holograms 66, 67 and 68 of the reflection type are projected as diffracted scanning beams L3 from a predetermined region of the reading window 30 and scan a bar code 50a of a commodity 50.

On the other hand, scattered signal light S1 in the returning path first enters the transparent block 70 from the reading window 30 and advances reversely along the substantially same light path with the scanning beam in the forward path. Thus, the scattered signal light S1 passes through the scanning pattern generating hologram 65 and is introduced to the polygon mirror 23, whereafter it comes to a location around the plane mirror portion 75a of the hologram 75 of the light condensing reflection type, that is, to a region of the hologram 75b of the reflection type having a light converging function. The scattered signal light S1 is diffracted in the predetermined direction by the hologram 75b of the reflection type and condensed to a photo-detector 20, by which information of the bar code 50a is read.

With the optical scanner of the present embodiment described above, since a concave mirror which is required in the prior art apparatus shown in FIG. 1 is unnecessary, reduction in thickness of the entire apparatus can be attained, and reduction in cost can also be attained.

Figure 20:
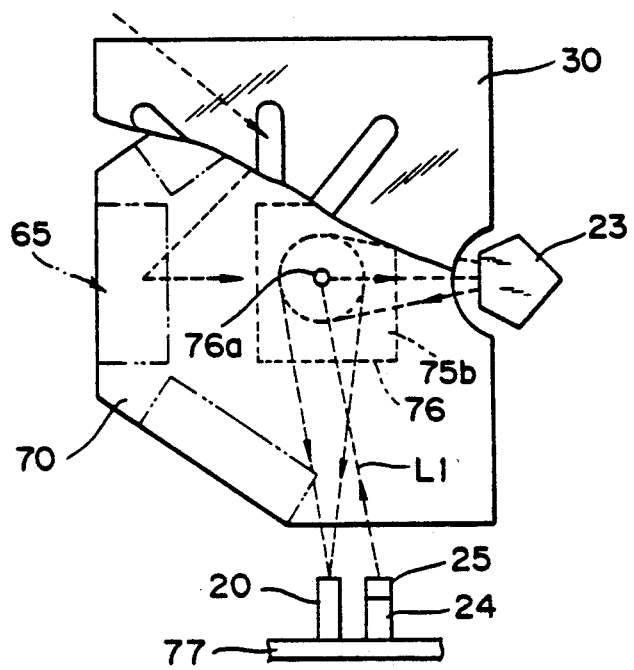
FIG. 20 is a plan view, partly broken, of a ninth embodiment of the present invention.

Referring now to FIG. 20, there is shown a ninth embodiment of the present invention. The present embodiment is generally similar in construction to the eighth embodiment shown in FIGS. 17 to 19 and only different in that the hologram 75 of the light condensing reflection type of the eighth embodiment is replaced by a hologram 76 of the light condensing reflection type which has a small hologram 76a of the reflection type provided at a central portion thereof for diffracting an incident light beam and a hologram 75b of the reflection type disposed around the hologram 76a of the reflection type and having a light converging function similar to that of the eighth embodiment.

With the present embodiment, when the hologram 76a of the reflection type for diffracting an incident laser beam is produced, the incident angle of a laser beam and the emergent angle of a diffracted beam can be changed freely. Accordingly, if the incident angle of a laser beam and the emergent angle of a diffracted beam are set suitably, then it is possible to dispose a beam shaper 25 and a photo-detector 20 in a juxtaposed relationship to each other as seen from an incident laser beam indicated by a broken line L1. Since the laser tube 24 and the photo-detector 20 can thus be installed on a same substrate 77, the entire apparatus can be further reduced in size.

Figure 21:
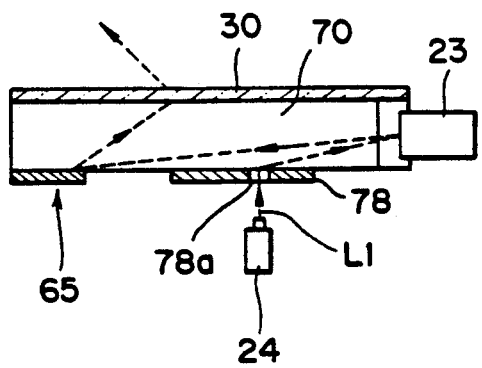
FIG. 21 is a schematic side elevational view of a tenth embodiment of the present invention.
Figure 22:
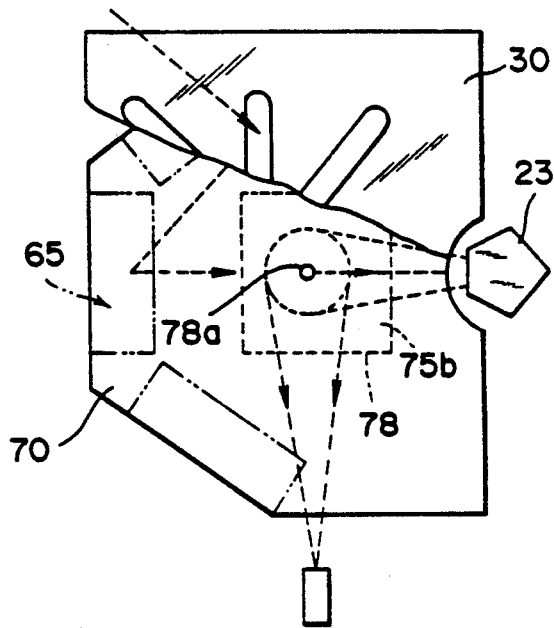
FIG. 22 is a plan view, partly broken, of the tenth embodiment of the present invention showing a relative positional relationship of several components.

Finally, a tenth embodiment of the present invention will be described with reference to FIGS. 21 and 22. The present embodiment is substantially similar in construction to the eighth embodiment shown in FIGS. 17 to 19 and different in that the hologram 75 of the light condensing reflection type is replaced by a hologram 78 of the light condensing reflection type which is constituted such that it has a hologram 78a of the transmission type at a central portion thereof for passing an incident laser beam therethrough and for projecting diffracted light in a predetermined direction, and a hologram 75b of the reflection type provided around the hologram 78a of the transmission type and similar to that of the eighth embodiment.

With the present embodiment, since an incident laser beam. L1 must necessarily pass through the hologram 78a of the transmission type, a laser tube 24 must be disposed below the hologram 78 of the light condensing reflection type, but when the hologram 78a of the transmission type is formed, the hologram 78a can have a function of modifying a shape of a beam. Accordingly, the beam shaper 25 which is required in the prior art arrangement is unnecessary, and consequently, reduction in overall size of the apparatus and also in production cost can be attained.

What is claimed is:

1. An optical scanner having a reading window and adapted to produce a plurality of scanning lines on said reading window, comprising:

a light source for generating a laser beam;

scanning means for scanning the laser beam so as to produce a plurality of parallel rows of horizontal scanning lines;

a plurality of strip holograms of the reflection type disposed corresponding to said plurality of rows of horizontal scanning lines, for diffracting the incident laser beam from said scanning means in different directions from each other to produce the plurality of scanning lines on said reading window;

a photo-detector for detecting scattered signal light scattered by an object to be read, which is positioned in the neighborhood of said reading window; and means for deflecting and condensing the scattered signal light to said photo-detector.

2. An optical scanner according to claim 1, wherein said scanning means includes a polygon mirror which is driven to rotate around an axis of rotation and which has a plurality of reflecting faces, with adjacent ones of said reflecting faces being disposed at different angles with respect to said axis of rotation so as to produce the plurality of parallel rows of horizontal scanning lines.

3. An optical scanner according to claim 1, wherein said reading window has a plurality of strip holograms of the transmission type provided thereon.

4. An optical scanner comprising:

a light source for generating a laser;

a polygon mirror driven to rotate for linearly scanning the laser beam;

a reading window;

scanning pattern generating means, formed by a plurality of plane mirrors, for deflecting the laser beam reflected by said polygon mirror to produce a scanning pattern formed from a plurality of scanning lines on said reading window;

a photo-detector for detecting scattered signal light scattered by an object to be read which is positioned in the neighborhood of said reading window; and light condensing means for deflecting and condensing the scattered signal light to said photo-detector, said light condensing means and at least one of said plane mirrors being integrated with each other to form a hologram module of the reflection type.

5. An optical scanner according to claim 4, wherein said reading window has a plurality of strip holograms of the transmission type provided thereon.

* * * * *

UNITED STATES PATENT AND TRADEMARK OFFICE
CERTIFICATE OF CORRECTION

PATENT NO. : 5,245,170
DATED : SEPTEMBER 14, 1993
INVENTOR(S) : Hirokazu ARITAKE, et al.

It is certified that error appears in the above-identified patent and that said Letters Patent is hereby corrected as shown below:

TITLE PAGE [60] line 1, after "1992," insert --now U.S. Pat. No. 5,231,277--.

Col. 1, line 6, after "1992," insert --now U.S. Pat. No. 5,231,277--.

Col. 3, line 10, "lines" should be --lines;--.

Col. 14, line 46, "laser;" should be --laser beam;--.

Signed and Sealed this

Thirteenth Day of September, 1994

Attest:

BRUCE LEHMAN

Attesting Officer

Commissioner of Patents and Trademarks